A. E. SENGSTOCK.
FILM REEL HOLDER.
APPLICATION FILED JAN. 27, 1915.
1,153,963.
Patented Sept. 21, 1915.
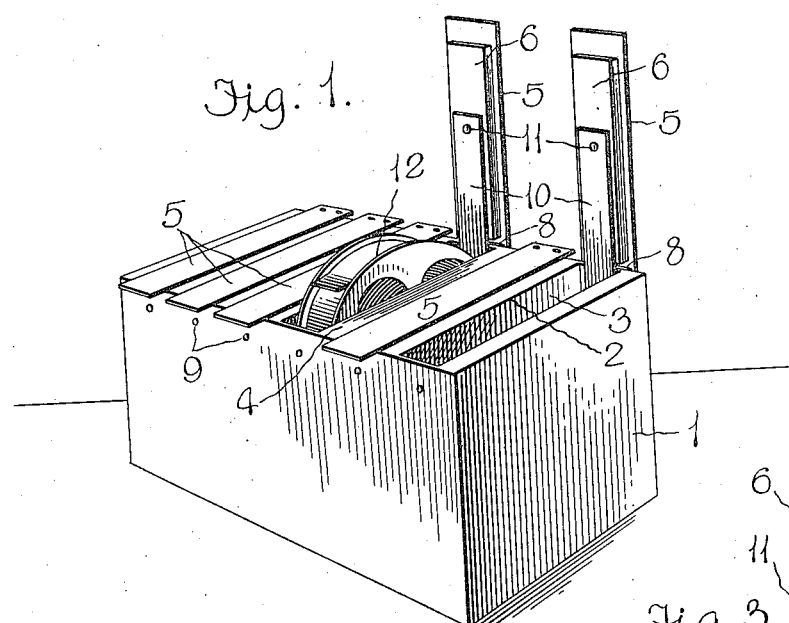
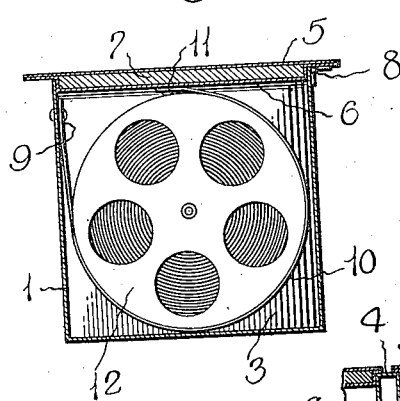 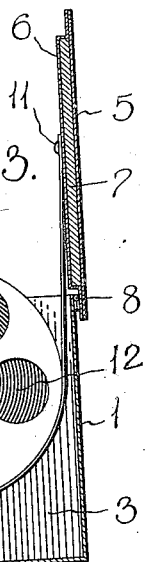 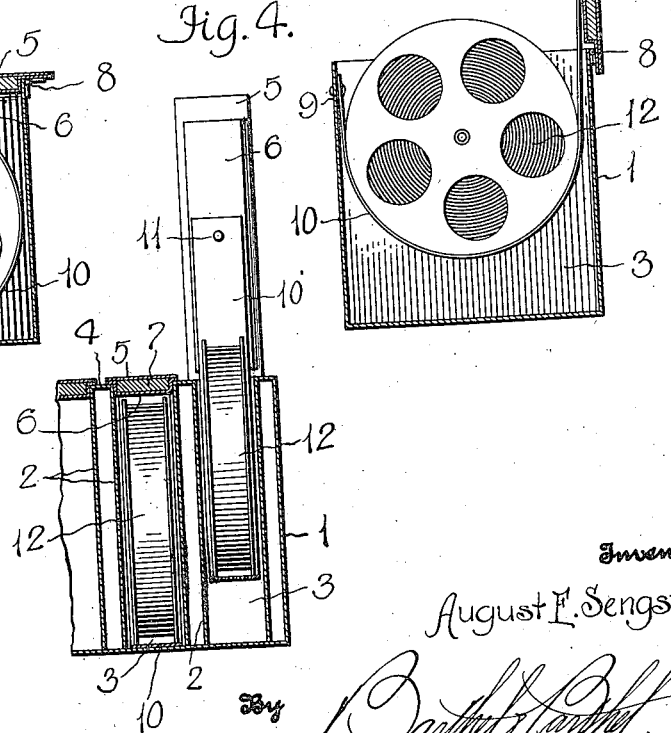
Inventor
August E. Sengstock.

UNITED STATES PATENT OFFICE.

AUGUST E. SENGSTOCK, OF DETROIT, MICHIGAN.

FILM-REEL HOLDER.

1,153,963.

Specification of Letters Patent. Patented Sept. 21, 1915.

Application filed January 27, 1915. Serial No. 4,600.

*To all whom it may concern:*

Be it known that I, AUGUST E. SENGSTOCK, a citizen of the United States of America, residing at Detroit, in the county of Wayne and State of Michigan, have invented certain new and useful Improvements in Film-Reel Holders, of which the following is a specification, reference being had therein to the accompanying drawings.

This invention relates to a film reel holder, and the primary object of my invention is to provide a compartment or partitioned holder for film reels having individual closures for each compartment thereof that are automatically closed when a film reel is deposited in a compartment of the holder, thereby precluding any danger of a film reel within the holder being exposed to fire or detonation.

Another object of this invention is to provide a fire proof container or holder for film reels in which it is impossible to place a film reel without the container or holder being closed, thereby providing a safe guard for the negligence of a film reel operator who fails to properly incase film reels.

A further object of this invention is to furnish a film reel holder or container with a closure attachment that will partially elevate a film reel when the closure is open, thereby permitting of a film reel being easily gripped for removal from its container or holder.

A still further object of this invention is to provide a simple, durable and inexpensive fire proof magazine holder or container that can be advantageously used for inclosing a plurality of film reels in a manner that permits of a single reel being placed in or removed from the container without disturbing other reels.

The above are a few of the many objects attained by the mechanical construction which will be hereinafter specifically described and then claimed, and reference will now be had to the drawings, wherein—

Figure 1 is a perspective view of a holder or container; Fig. 2 is a cross sectional view of the same showing a closed compartment with a film reel therein; Fig. 3 is a similar view showing the compartment open and a film reel partially elevated, and Fig. 4 is a longitudinal sectional view of the holder partly broken away, illustrating a film reel completely housed within one compartment of the holder and another film reel partly withdrawn from another compartment of the holder.

A film reel holder or container in accordance with this invention comprises a box like casing 1 having a plurality of transverse partitions 2 dividing the casing into compartments 3. The casing 1 is preferably made of light durable metal, as galvanized sheet iron, and the partitions 2 are also made of metal and are preferably hollow. The partitions 2 have the upper edges thereof flush with the upper edges of the casing 1 and afford ledges 4 for lids or closures 5 adapted to close the compartment 3. The lids or closures 5 are also made of metal and are of greater width and length than the upper open ends of the compartments 3, whereby the lids or closures will extend on to the ledges 4 of the partition and positively close the compartments. The lids or closures are made of a greater length than the upper ends of the compartments whereby the forward ends of the lids or closures will project from the front side or wall of the casing and constitute a lip or handle, as best shown in Fig. 2, to facilitate opening the lid or closure. The lids or closures are also provided with longitudinal depending portions 6 containing fillers 7 and these depending portions are adapted to fit in the upper open ends of the compartments 3 and besides positively closing said compartments, said depending portions prevent the lids or closures from becoming laterally displaced. Each lid or closure is hinged as at 8 to the upper rear edge of the casing, and with the rear ends of the lids or closures projecting from the rear wall of the casing, the rear ends of the lids or closures serve functionally as stops impinging the rear wall of the casing to limit the opening movement of the lids or closures.

Attached to the front wall of each compartment, as at 9, is the end of a resilient strap 10, which has the opposite end thereof attached to the lid or closure of said compartment, as at 11. The strap 10 constitutes means actuated by a film reel 12 placed in the compartment for closing the lid or closure of said compartment, and when the lid or closure is in an open position, as shown in Fig. 3 the strap 10 is elevated within the compartment and is impinged when a film reel is placed in a compartment, consequently there is no danger of the lid or closure 5 remaining open after a film reel has been placed within the compartment. Then again, the strap 10 serves functionally as means for elevating the film reel from the compartment, when the lid or closure is open whereby the film reel can be easily gripped by the hand and bodily removed.

The straps 10 can be arranged to hold the lids or closures open when the compartments are empty or said straps can be arranged to automatically close the lids or closures after the film reels have been removed. It is preferable however to have the lids or closures remain open after film reels have been removed, whereby an operator can readily determine which compartments are empty and into which compartments the film reels belong.

It is apparent from the foregoing that while there has been illustrated and described a magazine film holder, that a walled compartment and the lid or closure thereof constitute a container and as such can be readily used as a carrier for a single film reel. Whether singularly or collectively, each precludes any possibility of the lids or closures remaining open after a film reel has been placed in the container, consequently the inflammable films are fully protected against fire.

One embodiment of my invention has been illustrated, and it is to be understood that the structural elements are susceptible to the variations and modifications as fall within the scope of the appended claims.

What I claim is:—

A film reel holder comprising a casing, transverse partitions providing compartments within said casing adapted to contain film reels, individual hinged lids for the compartments of said casing adapted to overlie said partitions and project from the front wall of said casing to facilitate opening said lids and projecting from the rear wall of said casing to engage said wall and limit the opening movement of said lids, and flexible straps in the compartments of said casing approximately the width of each compartment and connected to said lids intermediate the ends thereof and to the inner side of the front wall at the upper edge thereof and adapted to conform to the peripheries of reel holders placed thereon, whereby said lids are closed by film reels descending by gravity into the compartments of said casing.

In testimony whereof I affix my signature in presence of two witnesses.

AUGUST E. SENGSTOCK.

Witnesses:
 LEWIS E. FLANDERS,
 ANNA M. DORR.